Oct. 21, 1969    R. B. LIGHTNER    3,474,370
STRIP CONDUCTOR COIL CONSTRUCTION AND METHOD AND APPARATUS
FOR MAKING THE SAME OR THE LIKE
Filed Oct. 12, 1966    4 Sheets-Sheet 1

INVENTOR
ROBERT B. LIGHTNER

BY Glenn, Palmer,
Matthews & Lyne
HIS ATTORNEYS

Oct. 21, 1969  R. B. LIGHTNER  3,474,370
STRIP CONDUCTOR COIL CONSTRUCTION AND METHOD AND APPARATUS
FOR MAKING THE SAME OR THE LIKE
Filed Oct. 12, 1966  4 Sheets-Sheet 2

INVENTOR
ROBERT B. LIGHTNER

BY Glenn, Palmer,
Matthews & Lyne

HIS ATTORNEYS

Oct. 21, 1969     R. B. LIGHTNER     3,474,370
STRIP CONDUCTOR COIL CONSTRUCTION AND METHOD AND APPARATUS FOR MAKING THE SAME OR THE LIKE

Filed Oct. 12, 1966     4 Sheets-Sheet 3

INVENTOR
ROBERT B. LIGHTNER

BY

HIS ATTORNEYS

INVENTOR
ROBERT B. LIGHTNER

BY *Glenn, Palmer,
Matthews & Lyne*

HIS ATTORNEYS

United States Patent Office 3,474,370
Patented Oct. 21, 1969

3,474,370
STRIP CONDUCTOR COIL CONSTRUCTION AND METHOD AND APPARATUS FOR MAKING THE SAME OR THE LIKE
Robert B. Lightner, Richmond, Va., assignor to Reynolds Metals Company, Richmond, Va., a corporation of Delaware
Filed Oct. 12, 1966, Ser. No. 586,161
Int. Cl. H01f 15/10
U.S. Cl. 336—192       6 Claims

ABSTRACT OF THE DISCLOSURE

A strip conductor coil construction and apparatus for and method of making the same wherein such coil construction has a metal core which is electrically insulated from adjoining coils of the coil construction by adhesive tape means which is also used to sandwich an inner lead of the coil construction between surface means of the tape means to provide optimum electrical insulation for such lead while defining a comparatively smooth surface against which adjoining coils of the coil construction may be wound.

---

This invention relates to an improved strip conductor coil construction as well as to an improved method and apparatus for making such a strip conductor coil construction or the like.

It is well known that a strip conductor coil construction can be provided by coiling a strip of conductive material onto a core element whereby the strip of conductive material has its inner end adjacent the core element and its outer end forming the outer coil of the construction, a pair of leads being transversely secured to the inner and outer ends of the strip of conductive material and an insulating strip being interleaved between the coils of the strip of conductive material to electrically insulate adjacent coils of the strip of conductive material from each other. In particular, such prior known strip conductor coil construction and method and apparatus for making the same is fully disclosed in the co-pending patent application, Ser. No. 497,069, filed Oct. 18, 1965, and assigned to the same assignee to which this application is also assigned.

However, according to the teachings of this invention, it has been found that in certain applications of strip conductor coil constructions and the like, the strip of conductive material must be mounted on a metallic core element which can be subsequently machined or appropriately fastened in a desired housing or the like for a particular use thereof.

Since such rigid core element comprises metallic material, electrical insulating problems are encountered because such metallic core element has the strip of conductive material wound thereon whereby the prior known methods and apparatus for such coil constructions were not continuous and required relatively expensive operations to provide adequate insulating means between the strip of conductive material and the metallic core element.

However, this invention provides a means wherein strip conductor coil constructions can be substantially continuously formed in a rapid and economical manner while still permitting each core element to be formed of metallic material and be fully electrically insulated from the strip of conductive material subsequently being coiled thereon.

Accordingly, it is an object of this invention to provide an improved strip conductor coil construction or the like having one or more of the novel features set forth above or hereinafter shown or described.

Another object of this invention is to provide an improved method for making such a strip conductor coil construction or the like.

A further object of this invention is to provide an improved apparatus for making such a strip conductor coil construction or the like.

Other objects, uses and advantages of this invention are apparent from a reading of this description which proceeds with reference to the accompanying drawings forming a part thereof and wherein.

Figure 1:
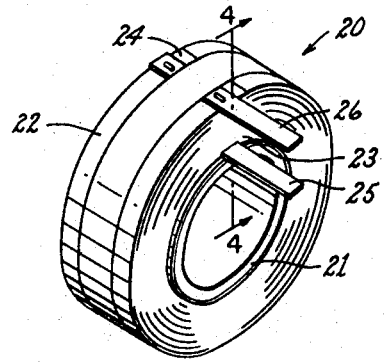
FIGURE 1 is a perspective view of the strip conductor coil construction of this invention.

While the various features of this invention are hereinafter described and illustrated as being particularly adaptable for providing substantially cylindrical conductor coil constructions or the like, it is to be understood that the various features of this invention can be utilized singly or in any combination thereof to provide strip conductor coil constructions having other types of configurations as desired.

Therefore, this invention is not to be limited to only the embodiment illustrated in the drawings, because the drawings are merely utilized to illustrate one of the wide variety of uses of this invention.

Referring now to FIGURE 1, the improved strip conductor coil construction of this invention is generally indicated by the reference numeral 20 and includes a hollow cylindrical metallic core element 21 having a strip 22 of conductive material coiled thereon in a manner hereinafter described with the strip 22 having an inner end 23 and an outer end 24 respectively carrying transversely disposed inner and outer leads 25 and 26 in a manner hereinafter described whereby the coil construction 20 can be mounted in the desired housing structure by the core element 21 thereof and have electrical current flowing through the strip 22 of conductor material when appropriate electrical connections are attached to the leads 25 and 26 in a manner well known in the art.

As previously stated, one of the problems encountered in forming a strip conductor coil construction having a metallic core element is to prevent short circuiting or other intereference between the metallic core element and the strip of conductive material thereon as well as to prevent such interference between the metallic core element and the leads secured to the strip of conductive material.

Figure 3:
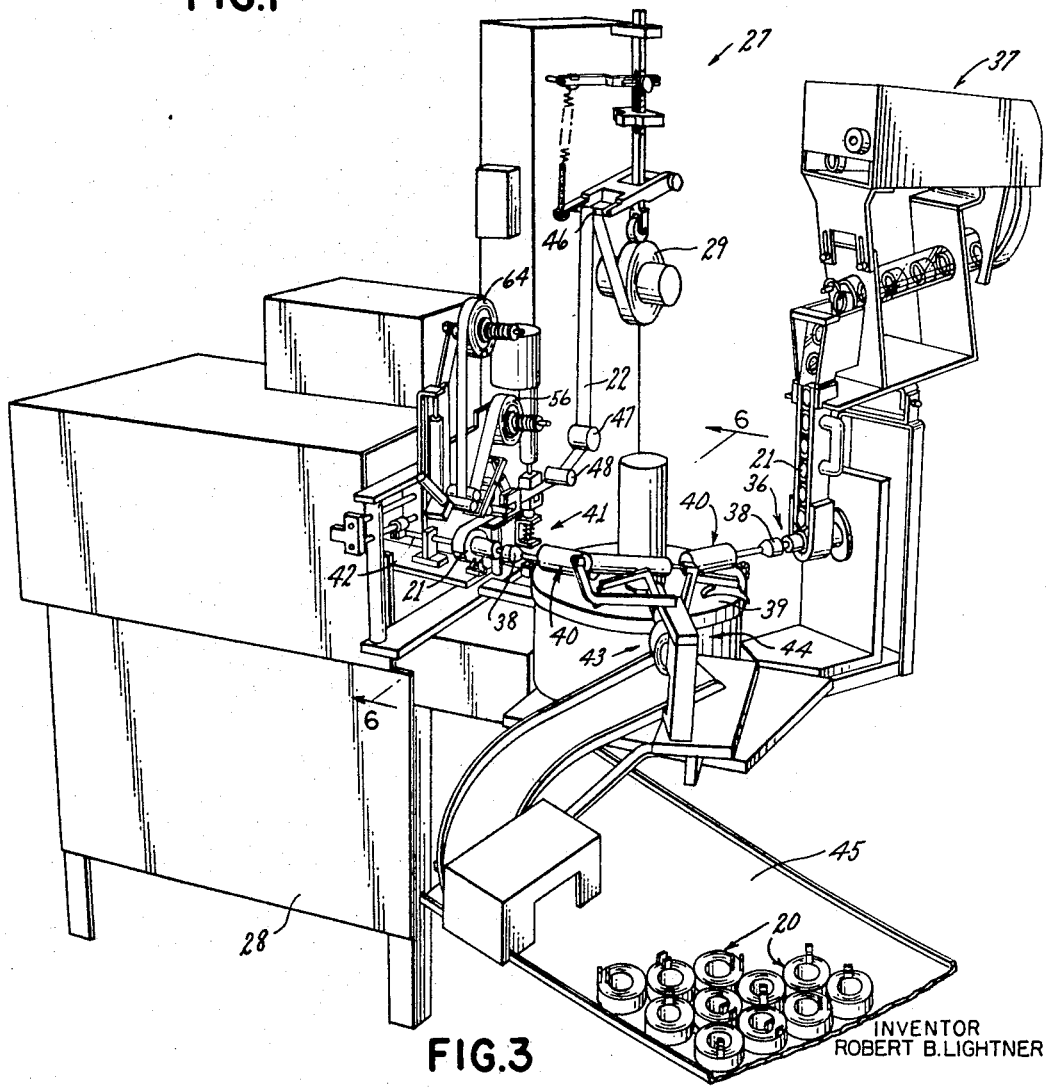
FIGURE 3 is a perspective view of the improved apparatus and method of this invention for making the strip conductor coil construction of FIGURE 1.
Figure 6:
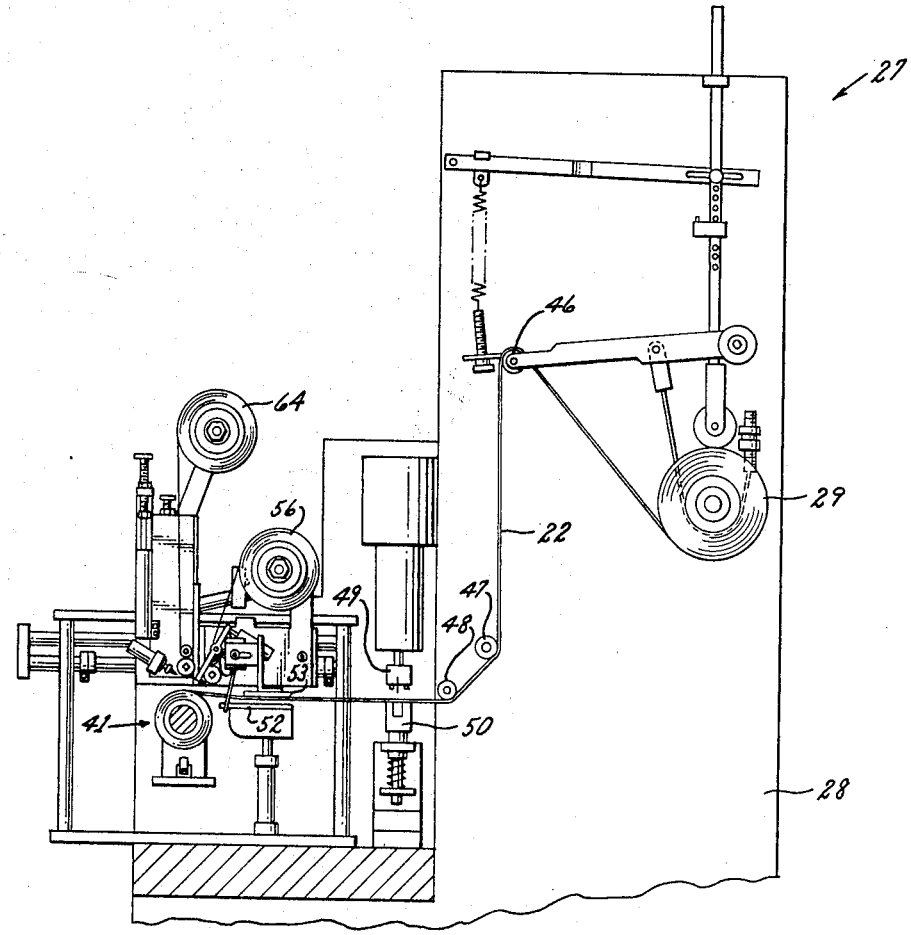
FIGURE 6 is a fragmentary, cross-sectional view taken on line 6—6 of FIGURE 3.

Accordingly, one feature of this invention is to provide an improved method and apparatus for making the strip conductor coil construction 20 in such a manner that no adverse problems exist when utilizing the metallic core element 21 and the strip 22 of conductive material, the method and apparatus of this invention being generally indicated by the reference numeral 27 in FIGURES 3 and 6 and now to be described.

As illustrated in FIGURES 3 and 6, the apparatus 27 includes a frame structure 28 rotatbly carrying a supply roll 29 of conductive strip material 22. If desired, the material 22 can be provided with a strip 30 of electrically insulating material laminated to one side 31 thereof in such a manner that the opposed side edges 32 and 33 of the insulating material 30 extend outwardly of the opposed side edges 34 and 35 of the strip of conductive material 22 so as to prevent short circuiting between adjacent coils of the strip of conductor material 22 at the side edges 34 and 35 thereof when the strip material 22 is wound on the core element 21 in the manner illustrated in FIGURE 4 as hereinafter described.

Alternately, the apparatus 27 can carry a separate supply roll of such insulating material 30 to be interleaved between adjacent coils of the strip of conductive material 22 during the coil winding operation hereinafter described rather than being prelaminated to the conductive strip 22 as illustrated in the drawings.

The metallic core elements 21 are adapted to be serially fed to a station 36 by a suitable hopper means 37 whereby a mandrel means 38 is adapted to be serially indexed by a rotatable table 39 to station 36 and be outwardly extended to be telescopically received within the core element 21 at the station 36 upon actuation of a piston and cylinder arrangement means 40. After the mandrel means 38 has been received in the core element 21 at the station 36, the mandrel means 38 is retracted at the station 36 to carry the particular core element 21 therewith away from the hopper means 37 whereby subsequent indexing of the table 39 carries that particular core carrying mandrel means 38 to a station 41 of the apparatus 27. With the core carrying mandrel means 38 now at the station 41, the piston and cylinder arrangement 40 thereof is actuated to extend the core carrying mandrel means 38 radially outwardly to interconnect the mandrel means 38 to a drive shaft 42 of the apparatus 27 so that when the drive shaft 27 is rotated in a manner hereinafter described, the mandrel means 38 and its core element 21 rotate in unison therewith to produce the strip conductor coil construction 20 of this invention in a manner hereinafter described.

After a particular strip conductor coil construction 20 has been formed on the mandrel means 38 at the station 41, the mandrel means 38 at the station 41 is retracted so that subsequent indexing of the table 39 carries the particular mandrel means 38 to an ejecting station 43 of the apparatus 27 where suitable stripping apparatus 44 will strip the completed strip conductor coil construction 20 from the mandrel means 38 at the station 43 so as to be deposited in a supply chute 45 for subsequent testing, packaging, storing and like operations.

When the completed strip conductor coil construction 20 has been stripped from the mandrel means 38 at the station 43, it can be seen that that particular mandrel means 38 will then be indexed back to the station 36 to pick up another metallic core element 21 to be subsequently carried to the station 41 to have another strip conductor coil construction formed thereon in a manner now to be described.

Figure 2:
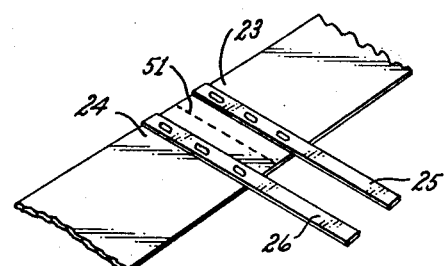
FIGURE 2 is a fragmentary, perspective view illustrating how the leads of the strip conductor coil construction of FIGURE 1 are attached thereto by the apparatus of FIGURE 3.

As illustrated in FIGURES 3 and 6, the strip means 22 is adapted to be fed from the supply roll 29 around slack reducing and tension applying roller means 46 and guide roller means 47 and 48 to pass through cooperating die means 49 and 50 which when operated will cold weld a pair of leads 26 and 25 to the strip of conductive material 22 in side-by-side relation in the manner illustrated in FIGURE 2 while forming perforated separation line means 51 therebetween for a purpose hereinafter described.

Figure 7:
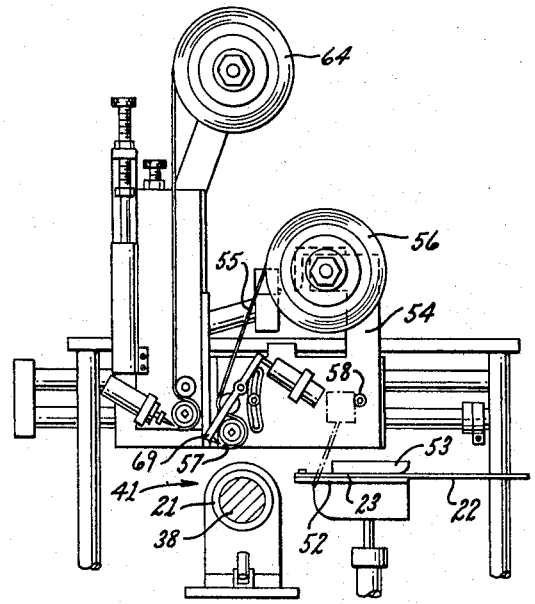
FIGURES 7–14 are respectively enlarged views similar to FIGURE 6 illustrating the various steps in the method of this invention.

The forward or leading end 23 of the strip of material 22 is normally positioned on a table means 52 of the apparatus 27 in the manner illustrated in FIGURE 7 and is held thereto by pressure means 53 during the time a core carrying mandrel means 38 is being indexed to the station 41 and being interconnected to the drive shaft 42 as illustrated in FIGURE 3. In this manner, the metallic core element 21 will be disposed in the position illustrated in FIGURE 7 for subsequent rotation thereof.

Figure 8:
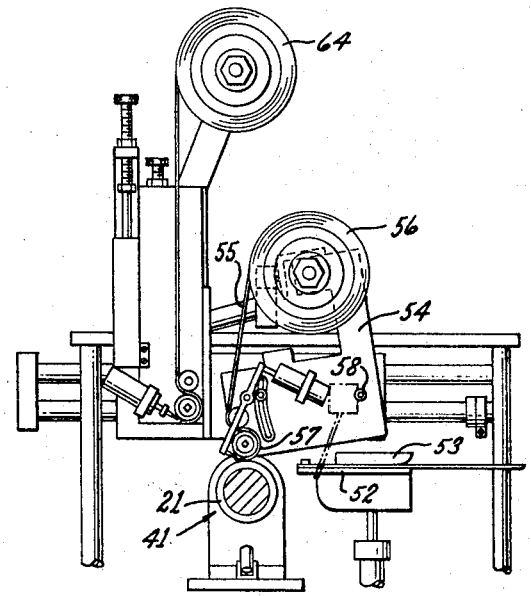

A first tape applying head 54 is adapted to draw an electrically insulating, pressure sensitive strip of tape means 55 from a supply roll 56 thereof and have the forward or leading end 57 thereof disposed against the core element 21 in the manner illustrated in FIGURE 8 when the head 54 is pivoted relative to the apparatus 27 about a pivot point 58. Since the tape strip 55 has the pressure sensitive adhesive means on the side thereof which engages the core element 21 in the manner illustrated in FIGURE 8, the leading end 57 of the strip of tape means 55 is now secured to the core element 21 completely across the outer surface means 59 of the core element 21 from one opposed side edge 60 thereof to the other opposed side edge 61 in the manner illustrated in FIGURES 4 and 5.

Figure 9:
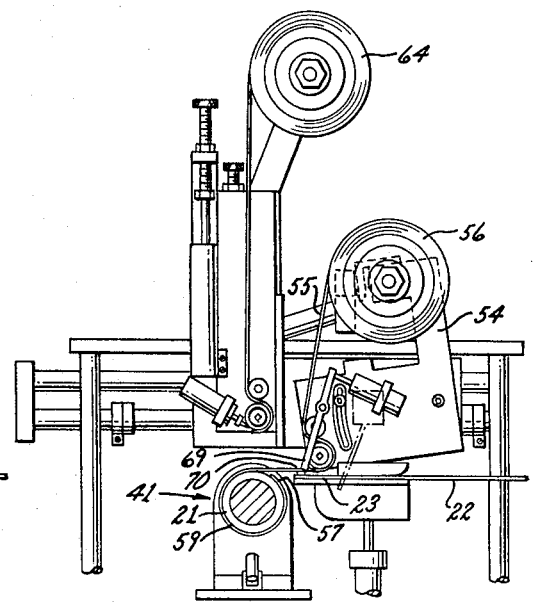

With the leading end 57 of the tape 55 now secured to the core element 21 in the manner illustrated in FIGURE 8, the taping head 54 is moved from left to right in the manner illustrated in FIGURE 9 to have its adhesive side engaged against and secured to the inner end or leading end 23 of the strip of material 22 in the manner illustrated in FIGURE 9 whereby suitable knife means 69 can subsequently sever the tape means 55 from the head 54 in the manner illustrated in FIGURE 10.

In this manner, a sufficient length of tape means 55 is fed from the taping head 54 so that the entire outer circumference of the outer surface means 59 of the core element 21 will be covered with the pressure sensitive tape 55 before the inner end 23 of the strip 22 of conductive material is drawn onto the core element 21 through subsequent rotation thereof. However, in the embodiment of the apparatus 27 illustrated in the drawings, the core element 21 can be rotated in a counterclockwise direction after the end 57 of the tape 55 has been secured thereto in the manner illustrated in FIGURE 8 to permit the tape 55 to be drawn completely around the core element 21 in the manner illustrated in FIGURE 9 at which time the outer end 70 of the applied tape 55 is secured to the inner end 23 of the strip 22 of conductive material as illustrated in FIGURE 10.

Figure 10:
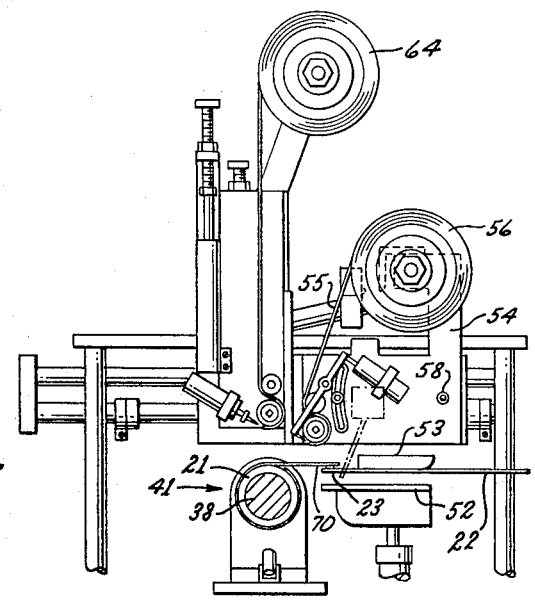
Figure 11:
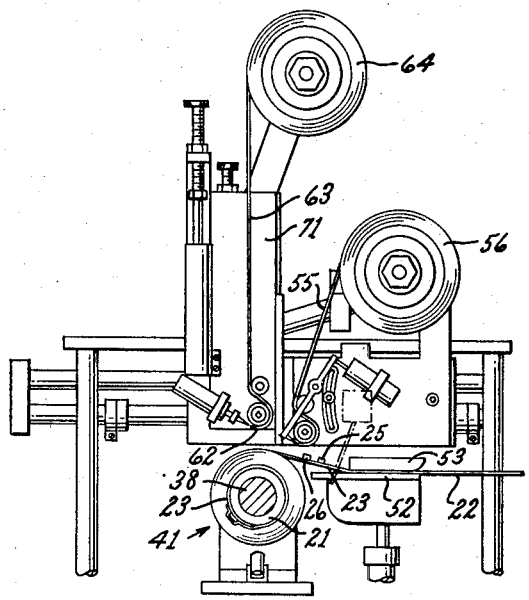

After the length of tape 55 has now secured the inner end 23 of the strip of conductive material 22 to the core element 21 in the manner illustrated in FIGURE 10, subsequent counterclockwise rotation of the mandrel means 38 at the station 41 causes the core element 21 to rotate in a counterclockwise direction therewith and draw the strip of conductive material 22 onto the core element 21 to be coiled thereon on top of the tape means 55 in the manner illustrated in FIGURE 11.

However, during the coil winding operation, suitable mechanism stops the winding operation at a predetermined time to cause the die means 49 and 50 to cooperate together and cold weld a set of leads 26 and 25 transversely across the strip 22 in the manner illustrated in FIGURE 2 and define the separation line 51 therebetween.

Subsequently, the attached set of leads 26 and 25 are drawn from between the cold welding apparatus 49 and 50 to the position illustrated in FIGURE 11 whereby the pressure member 53 holds the portion of the strip 22 carrying the lead 25 against the table 52 in the manner illustrated in FIGURE 11. Thus, further rotation of the core element 21 in a counterclockwise direction causes the strip of material 22 to separate at the separation line 51 between leads 26 and 25 so that the lead 26 are now severed end 24 of the strip 22 can be wound on the core element 21 to complete the strip conductor coil construction 20 of this invention while the new leading end 23 of the strip 22 and its attached lead 25 is being held at the table 52 by the pressure means 53 to subsequently form the inner part of another strip conductor coil construction 20.

Figure 13:
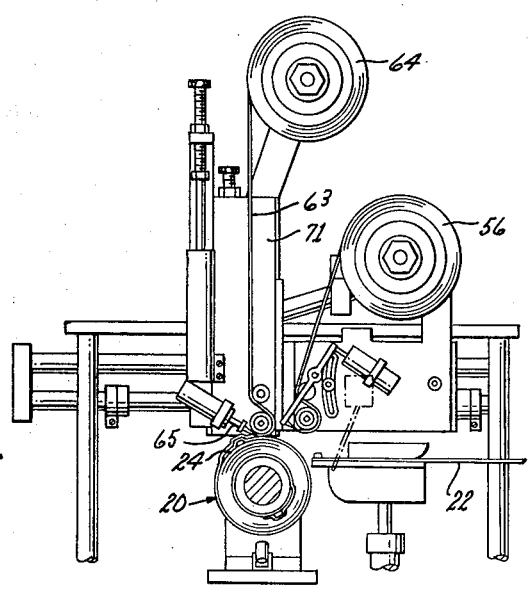
Figure 12:
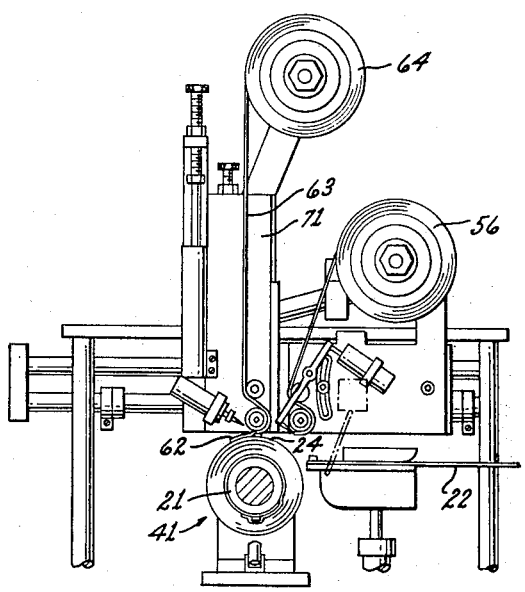

As the core element 21 is being rotated in a counter-clockwise direction at the station 41, a second taping head 71 applies a leading end 62 of another strip of pressure sensitive tape means 63 from a supply roll 64 thereof against the outer coil of the coil construction 20 in the manner illustrated in FIGURE 12 so that further rotation of the core element 21 in a counterclockwise direction causes the tape means 63 to be drawn thereon completely around the same in the manner illustrated in FIGURES 1 and 13 to fully hold the outer coil or end 24 of the strip 22 to its adjacent inner coil to prevent unwinding thereof.

Figure 14:
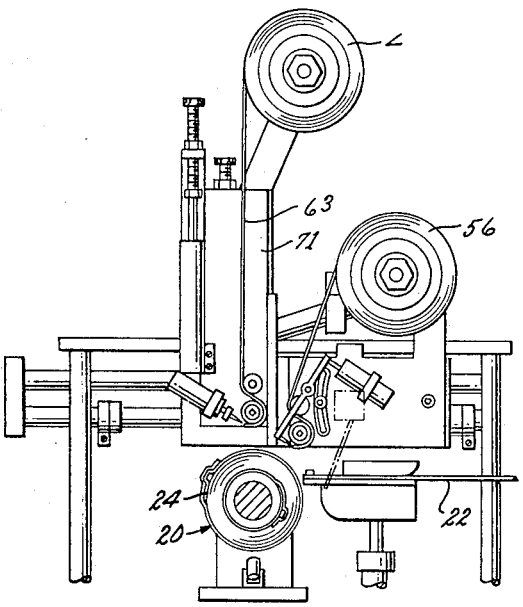

After the second tape means 63 has been applied completely around the coil construction 20 or around a part thereof sufficient to hold the end 24 of the strip 22 to the inner adjacent coil of the strip 22, suitable knife means 65 cuts the applied tape 63 from the head 71 in the manner illustrated in FIGURE 13 so that the strip conductor coil construction 20 is now completed in the manner illustrated in FIGURE 14 to be retracted from the station 41 and be indexed to the station 43 by the table 39 in the manner previously described.

Thus, as the completed coil construction 20 is being indexed to the station 43 to be ejected into the supply chute 45, another mandrel means 38 is carrying a core element 21 from the station 36 to the station 41 to have a length of the strip 22 coiled thereon in the manner previously described whereby the apparatus 27 of this invention is adapted to substantially continuously form strip conductor coils 20 in the manner previously described.

For further details of the structure and operation of the method and apparatus 27 of this invention, reference should be made to the aforementioned copending patent application.

Figure 4:
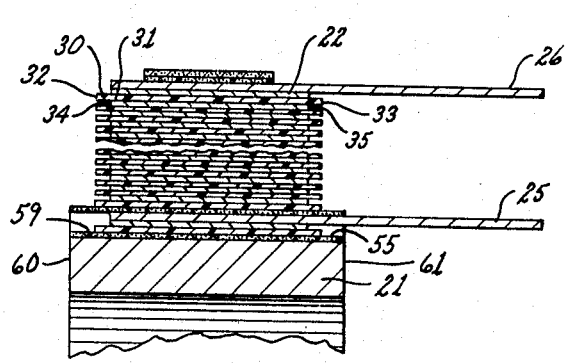
FIGURE 4 is an enlarged, fragmentary, cross-sectional view taken on line 4—4 of FIGURE 1.
Figure 5:
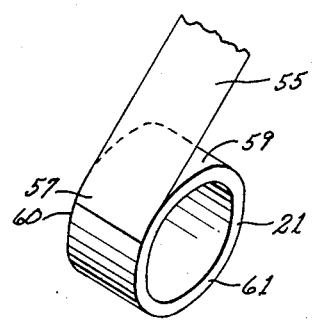
FIGURE 5 is a fragmentary perspective view illustrating one of the steps in the method of this invention for forming the strip conductor coil construction of FIGURE 1.

As fully illustrated in FIGURES 4 and 5, it can be seen that the inner tape means 55 not only fully insulates the conductive strip 22 from the metallic core element 21 completely across the outer surface means 59 between the side edges 60 and 61, but also the inner tape means 55 fully insulates the leads 25 and 26 from the outer surface means 59 of the core element to prevent any adverse short circuiting or other interference from the metallic core element 21 to the normal operating functions of the conductive strip 22.

Thus, the insulating tape means 55 serves the dual function of providing electrical insulating properties and causing the conductive strip 22 to be drawn onto the core elements 21 in a manner to permit a substantially continuous strip conductor coil forming operation.

Accordingly, not only does this invention provide an improved strip conductor coil construction or the like, but also this invention provides an improved method and apparauts for making such a strip conductor coil construction or the like.

While the form of the invention now preferred has been disclosed as required by statute, other forms may be used, all coming within the scope of the claimed subject matter which follows.

What is claimed is:

1. A strip conductor coil construction comprising a metallic core element having opposed side edges and having outer surface means defined between said side edges, a strip of electrically insulating tape means having an inner end portion secured to and coiled around said outer surface means to thereby cover said entire outer surface means and having an outer end portion, a strip of electrically conductive material coiled on said core element and having an inner end, and a lead secured transversely to said inner end of said conductive strip and projecting outwardly from said coil thereof, said outer end portion of said tape means covering that portion of said lead which is coextensive in width with said conductive strip and said coextensive portion of said lead being sandwiched between adjoining surfaces of said tape means to assure said lead is electrically insulated from said outer surface means of said metalilc core element with said outer end portion of said tape means providing a comparatively smooth surface against which an adjoining coil of said coil construction is wound.

2. A strip conductor coil construction as set forth in claim 1 wherein another lead is transversely secured to the outer end of said conductive strip and projects outwardly from said coil thereof, a strip of electrically insulating material means interleaved between said coils of said conductive strip to electrically insulate the adjacent coils of said conductive strip from each other, and another tape means securing said outer end of said conductive strip to an adjacent coil of said conductive strip to hold said conductive strip in coiled relation on said core element.

3. A method for making a strip conductor coil construction comprising the steps of providing a metallic core element having an outer surface means, securing an inner end portion of electrically insulating tape means to said outer surface means with adhesive means, covering said entire outer surface means by coiling a strip of said tape means therearound, attaching an outer end portion of said tape means to an inner end of a strip of electrically conductive material, coiling said strip of electrically conductive material around said core element and over said tape means so that said tape means electrically insulates said conductive strip from said metallic core element, said coiling steps including the step of rotating said core element so that said tape means is coiled and secured thereon and draws the inner end of said conductive strip onto said core element for coiling said conductive strip on said core element, and transversely securing a lead to said inner end of said conductive strip so that said lead projects outwardly from said coil thereof, said lead being attached to said inner end of said conductive strip prior to attaching said outer end portion of said tape means in position, said tape means covering that portion of said lead which is coextensive in width with said conductive strip, and such that upon being coiled said coextensive portion of said lead being sandwiched between adjoining coils of said tape means to assure said lead is electrically insulated from said outer surface means of said metallic core element with said outer end portion of said tape means providing a comparatively smooth surface against which an adjoining coil of said coil construction is wound.

4. A method as set forth in claim 3 and including the steps of transversely securing another lead to said outer end of said conductive strip so that said other lead projects outwardly from said coil thereof, interleaving a strip of electrical insulating means between the coils of said conductive strip to electrically insulate the adjacent coils of said conductive strip from each other, and securing said outer end of said conductive strip to an adjacent coil of said conductive strip with another tape means to hold said conductive strip in coiled relation on said core element.

5. A method for making a strip conductor coil construction comprising the steps of providing a metallic core element having an outer surface means, providing a strip of electrically insulating tape means having inner and outer end portions, providing a strip of electrically conductive material having inner and outer ends, securing an inner and an outer lead transversely to said inner and outer ends of said conductive strip respectively so that said leads have portions thereof extending outwardly from a side edge of said conductive strip, securing the outer end portion of said tape means to said inner end of said conductive strip and covering that portion of said inner lead which is coextensive in width with said conductive strip, securing said inner end of said tape means to said outer surface means of said core element, and rotating said core element to draw said tape means thereon in coiled relation completely covering said outer surface means thereof before said inner end of said conductive strip is drawn onto said core element so that said inner lead is sandwiched between adjoining coils of said tape means whereby further rotation of said core element coils said strip of conductive material onto said core element with said outer end of said conductive strip forming the outer coil on said core element and with said tape means electrically insulating said conductive strip from said metallic core element and said outer end portion of said tape means providing a comparatively smooth surface against which an adjoining coil of said coil construction is wound.

6. Apparatus for making a strip conductor coil construction comprising means for holding a metallic core element having an outer surface means, means for providing a strip of electrically insulating tape means having inner and outer ends, means for providing a strip of electrically conductive material having inner and outer ends, means for respectively securing an inner and an outer lead transversely to said inner and outer ends of said conductive strip respectively so that said leads have portions thereof extending outwardly from a side edge of said conductive strip, means for securing the outer end of said tape means to said inner end of said conductive strip and completely covering that portion of said inner lead which is coextensive in width with said conductive strip, means for securing said inner end of said tape means to said outer surface means of said core element, and means for rotating said core element to draw said tape means thereon in coiled relation completely around said outer surface means thereof before said inner end of said conductive strip is drawn onto said core element so that said inner lead is sandwiched between adjoining coils of said tape means whereby further rotation of said core element coils said strip of conductive material onto said core element with said outer end of said conductive strip forming the outer coil on said core element and with said tape means electrically insulating said conductive strip from said metallic core element and said outer end portion of said tape means providing a comparatively smooth surface against which an adjoining coil of said coil construction may be wound.

References Cited

UNITED STATES PATENTS

| | | | |
|---|---|---|---|
| 2,969,888 | 1/1961 | Whiting | 242—56.1 X |
| 3,113,740 | 12/1963 | Hinds | 242—56.1 X |
| 3,207,650 | 9/1963 | Toensing | 156—468 X |
| 3,234,063 | 2/1966 | Masini | 29—605 X |
| 3,270,401 | 9/1966 | Staley et al. | 29—605 |
| 3,234,628 | 2/1966 | Frekko | 29—25.42 |

JOHN F. CAMPBELL, Primary Examiner

C. E. HALL, Assistant Examiner

U.S. Cl. X.R.

29—25.41, 203, 605; 156—446, 468; 242—56.1; 336—206, 232